July 29, 1941.  E. L. DAYTON  2,250,752
VALVE TAPPET
Filed Nov. 10, 1937  2 Sheets-Sheet 1
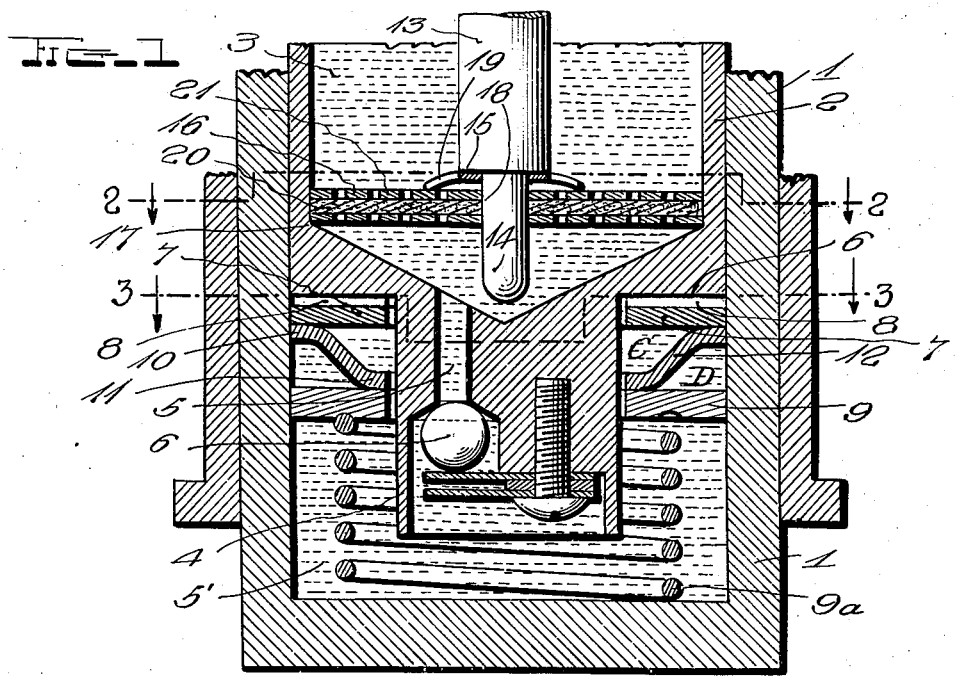
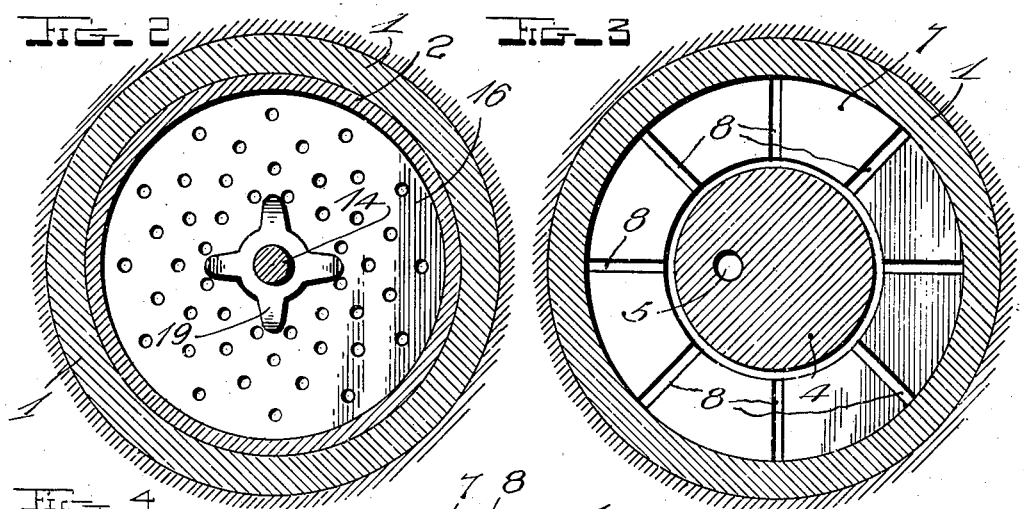
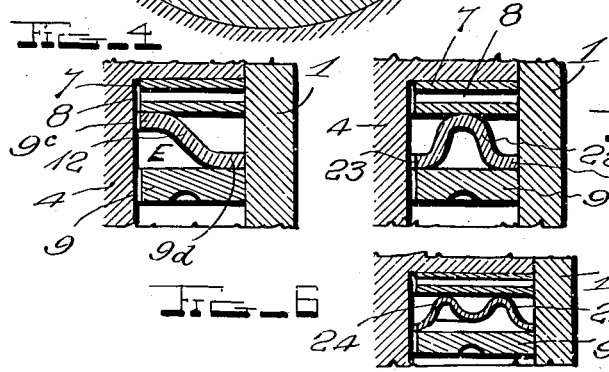
INVENTOR.
Ernest L. Dayton,
BY Edwin S. Clarkson
ATTORNEY.

July 29, 1941.  E. L. DAYTON  2,250,752
VALVE TAPPET
Filed Nov. 10, 1937  2 Sheets-Sheet 2
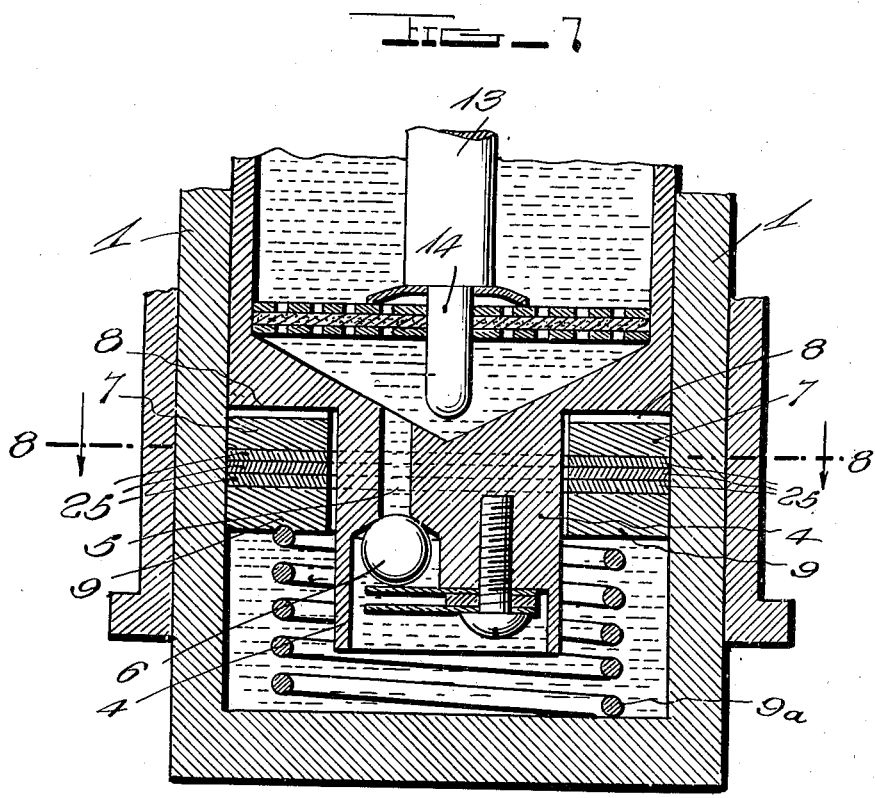
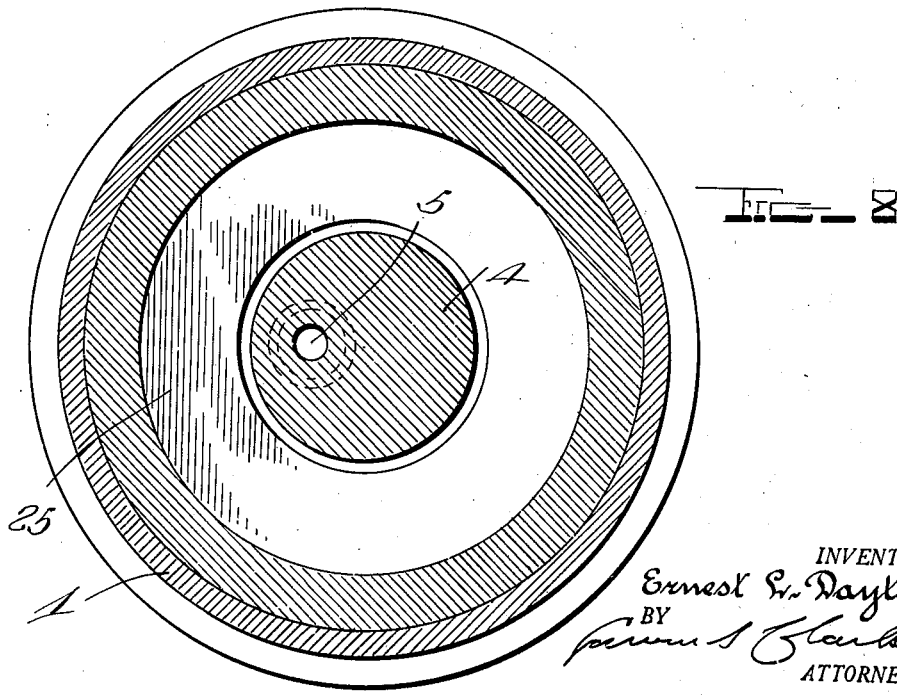
INVENTOR.
Ernest L. Dayton,
BY
ATTORNEY.

Patented July 29, 1941

2,250,752

UNITED STATES PATENT OFFICE 2,250,752

VALVE TAPPET

Ernest L. Dayton, Detroit, Mich., assignor to Eaton Manufacturing Company, Cleveland, Ohio, a corporation of Ohio Application November 10, 1937, Serial No. 173,909

3 Claims. (Cl. 123—90)

This invention relates to valve tappets of gas engines, or working parts of jacks, et cetera, which deliver power in one direction and in which the use of compensating means is desirable or necessary in order to compensate for looseness due to wear or lost motion of working parts.

The primary object of my invention is to seal the joint between the plunger or lifting member and its cylinder against the entrance of dirt or other foreign matter, the presence of which results in scarring and otherwise damaging the contacting surfaces of the plunger and its cylinder.

A further object of my invention is to automatically filter the oil as it passes from a reservoir into the oil well chamber; and with this and other objects in view my invention consists of the parts and combination of parts hereinafter pointed out in the appended claims.

In the drawings:

Figure 1 is a fragmentary central vertical longitudinal section on a large scale through the lower part of a valve tappet of a gas engine.

Figure 2 is a horizontal section on the line 2—2, Figure 1, looking in the direction of the arrows.

Figure 3 is a horizontal section on the line 3—3 of Figure 1, looking in the direction of the arrows.

Figure 4 is a fragmentary sectional view showing sealing ring in reverse position from that shown in Figure 1.

Figure 5 is a fragmentary sectional view showing modified form of sealing ring.

Figure 6 is a fragmentary sectional view showing still another form of the sealing ring.

Figure 7 is a view similar to Figure 1 showing another type of sealing ring.

Figure 8 is a sectional view on the line 8—8, Figure 7.

Referring to Figure 1, the reference numeral 1 designates the usual valve tappet cylinder, within which is slidably mounted the usual plunger 2 in which is formed the oil well, or reservoir 3. The plunger is provided with a reduced lower end 4. An oil port 5 leads from the reservoir 3 to the oil well 5', said port is provided with a suitable valve control 6".

The plunger 2 is provided with a shoulder 6 at the juncture of the plunger and its reduced portion 4. A relief ring 7 is seated on the shoulder 6, said ring being provided with oil ducts 8 extending transversely of the ring. A protecting ring 9 is seated on the coil spring 9a, the lower end of said spring being seated on the bottom of the oil well 5'. Between the relief ring 7 and the protecting ring 9 I position a self sealing or wiper ring 12. This sealing ring 12 is preferably made of ductile metal and is free in its movement of the protective ring 9 and relief ring 7, and is provided with spaced contact zones 10 and 11. The preferred shape for this ring is a substantially double L, but, of course, it may be of the shapes shown in Figures 4, 5 and 6.

The object of spacing the contact surfaces of this sealing ring is to reduce friction between the protecting ring 9 and the relief ring 7 whereby the sealing or wiper ring may the more readily expand in contact with the wall of the cylinder. The protecting ring 9 takes the pressure of the spring 9a and gives the portion of the sealing ring a freer and smoother sliding surface and relieves the sealing ring from binding action than if it were in direct contact with the spring 9a.

The push rod 13 has a reduced portion 14, there being a shoulder 15 at the juncture of the body of the rod and its reduced lower end. A filter 16 is seated in the bottom of the reservoir on the shoulder 17 and is provided with a central opening 18 through which the reduced end 13 of the rod 12 passes. A spring 19 of any desired shape is introduced between the filter and the shoulder 15. This filter comprises a filter body 20 of any approved filtering material on the top and bottom surfaces of which are perforated material 21, said material and filtering body being secured together in any suitable manner. The reduced end of the valve rod 13 passes through the opening 18 of the filter. I interpose between the filter and the valve rod 13 a cushioning spring 19. As stated, the filter rests on the shoulder 17 in the oil reservoir 3.

In Figure 5 the sealing ring is provided with a corrugation 22 whereby the ring has a three point contact, viz. the corrugation 22 and the marginal edges 23.

In Figure 6 the sealing ring is shown provided with a series of corrugations 24.

The oil in the well 5' tries to get past the sealing ring 12 and up the cylinder wall, but is prevented in doing so. The oil packs below the outer elevated marginal edge of the ring 12 and above the inner marginal edge of said ring, thus exerting a minimum load on said ring. The protecting ring 9 does not fit tight against the walls of the cylinder so that oil may pass between the periphery of the ring and the cylinder wall and fill the space D under the ring.

The combined pressure of the oil and the spring 9a on ring 9 results in an expansion of the ring 12 against the cylinder walls thereby preventing the oil from seeping between the periphery of the plunger and the inner face of the cylinder wall.

Above the ductile ring 12 is a safety pressure ring 7 which is provided with oil ducts 8 in its upper face. These ducts may be of different capacity according to the viscosity of oil used.

Pressure on the oil in the bottom of the cylinder results in some of the oil, in order to relieve pressure, seeping through the ducts 8 in the ring 7 from which it escapes between the plunger and the wall of the cylinder, the purpose being to allow for expansion in the engine valve operating mechanism.

In the old constructions the plunger was a definite diameter subject to change with the hot or cold matter thereby altering the amount of seepage space between the plunger and the cylinder wall; also, this seepage space dimension was altered by wear of the piston and on the wall of the cylinder. In this invention the ductile seal ring 12 is held in contact with the cylinder wall by coil spring 9a and protection ring 9, and also by the oil pressure. This seal may be so effective as to prevent the downward movement of the piston unless the relief ring provided with oil ducts is interposed.

In Figure 4 the parts of the assembly are the same as shown and described in connection with Figure 1 except that the sealing ring 12 is reversed so that its inner peripheral portion 9c is in contact with the relief ring 7, and its outer peripheral portion 9d is in contact with the protection ring 9. In this embodiment the oil packs in the space E which exerts an outer radial force on the ring 12.

By the use of this ductile ring, which, because of its ductility, fits tightly against the walls of the cylinder, I avoid the very costly precision workmanship heretofore necessary to make the plunger and cylinder sufficiently accurate to allow the proper amount of oil escapement.

In Figure 7 I have shown another type of sealing ring which consists of a plurality of independent rings 25. These rings preferably are made from ductile material.

It will, of course, be understood that the filter and grooved ring shown in Figures 2 and 3 will be preferably used with this type of sealing ring.

In assembling and in operation the outer periphery of these rings may become scored, which score may extend across the plurality of rings, thus forming a continuous port or channel through which oil may escape; due to the fact that the tappet is always turning, which action will cause the said rings to turn and as the rings are independent of each other they will not turn as a unit. Hence the turning of one or more of said rings independently of the other will break the continuity of the said score and prevent the escape of oil through said score.

What I claim is:

1. In a valve tappet, a cylinder having a reservoir therein, a plunger having a body slidably engaging the side walls of the cylinder, a seal comprising a member positioned at the end of the plunger body adjacent the reservoir and movable with the plunger, said member having a circular edge portion offset from the central portion thereof in the general direction of the axis of the plunger and engageable with the cylinder wall throughout the circumference thereof, said member also being formed of a material possessing the ductility required to provide for spreading of the member under the action of pressure applied to the member in the general direction of the plunger to intimately engage the circular edge of the member with the cylinder walls.

2. In a valve tappet, a cylinder having a fluid reservoir therein, a plunger having a body slidably engaging the cylinder walls, a continuous sealing ring movable with the plunger and positioned at the end of the plunger body adjacent the reservoir, said ring having an axially offset peripheral edge slidably engaging the cylinder walls and being formed of a material possessing sufficient ductility to afford relatively easy spreading of the ring under the action of a pressure applied to the central portion of the ring in the direction of the plunger body to frictionally engage the peripheral edge of the ring with the cylinder walls, a pressure relief member located between the plunger body and sealing ring and slidably engaged by the offset peripheral edge of the sealing ring, and a protecting ring also movable with the plunger and having a sliding engagement with the central portion of the sealing ring.

3. In a valve tappet, a cylinder having a fluid reservoir therein, a plunger having a body portion slidably engageable with the cylinder walls, a seal positioned at the end of the plunger adjacent the reservoir and movable with the plunger, said seal comprising a member of ductile metal having a circular outer edge frictionally engaging the cylinder walls and having axially spaced portions responsive to the application of pressure on the member in the general direction of movement of the plunger to effect spreading of the member and insure a continuous circumferential engagement of the outer circular edge of the member with the cylinder walls.

ERNEST L. DAYTON.